United States Patent
Schock et al.

[11] Patent Number: 6,030,004
[45] Date of Patent: Feb. 29, 2000

[54] HIGH TORQUE THREADED TOOL JOINT FOR DRILL PIPE AND OTHER DRILL STEM COMPONENTS

[75] Inventors: William H. Schock, Duson; Steven P. Howard, Youngsville; James G. Vogelsang, Lafayette, all of La.; Richard L. Clark, Jr., Houston; Michael D. Rose, Austin, both of Tex.

[73] Assignee: Shaw Industries, Rexdale, Canada

[21] Appl. No.: 08/987,195

[22] Filed: Dec. 8, 1997

[51] Int. Cl.[7] ................................. F16L 35/04; F16B 7/00
[52] U.S. Cl. .......................... 285/333; 285/333; 285/390
[58] Field of Search .................................. 285/333, 334, 285/390; 403/343

[56] References Cited

U.S. PATENT DOCUMENTS

| | | | |
|---|---|---|---|
| 3,129,963 | 4/1964 | Robbins | 285/334 |
| 3,388,935 | 6/1968 | Hjalsten et al. | 285/334 |
| 4,113,290 | 9/1978 | Miida | 285/334 |
| 4,548,431 | 10/1985 | Hall et al. | |
| 4,630,849 | 12/1986 | Fukui et al. | 285/333 |
| 4,687,368 | 8/1987 | Eklof et al. | 403/343 |
| 5,060,740 | 10/1991 | Yousef et al. | 285/334 |
| 5,163,523 | 11/1992 | Yousef et al. | 285/334 |
| 5,169,183 | 12/1992 | Hallez | 285/334 |
| 5,505,502 | 4/1996 | Smith et al. | 285/334 |
| 5,549,336 | 8/1996 | Hori et al. | 285/333 |

*Primary Examiner*—Eric K Nicholson
*Attorney, Agent, or Firm*—Mayor, Day, Caldwell & Keeton, L.L.P.

[57] ABSTRACT

A double shouldered high torque resistance threaded connection for drill stem components having enhanced resistance to torque forces, tensile loads and material stress and fatigue is disclosed. The tool joint is provided with threads having a 75° included angle between the thread flanks thereof and with generally elliptical root surfaces to minimize material stress and fatigue during operation under high torque and high tensile loads. When made up, the double intrerengaging shoulders of the threaded tool joint are in firm face to face engagement permitting torque forces and tensile loads to propagate through the tool joint in a manner that minimizes bending forces and minimizes high stress concentration so that the resulting service life of the tool joint is significantly enhanced.

17 Claims, 4 Drawing Sheets

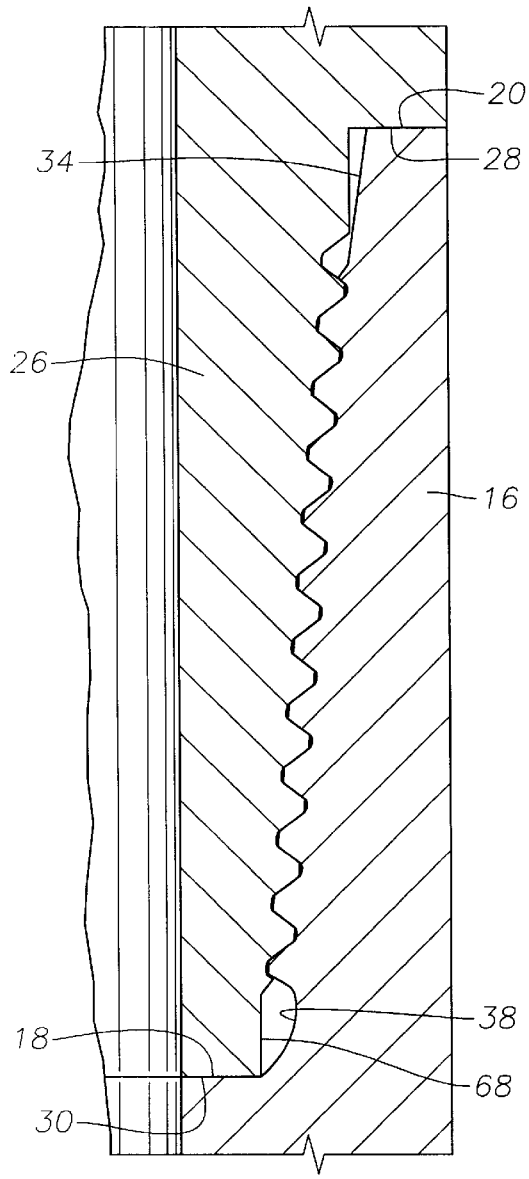
Fig. 4
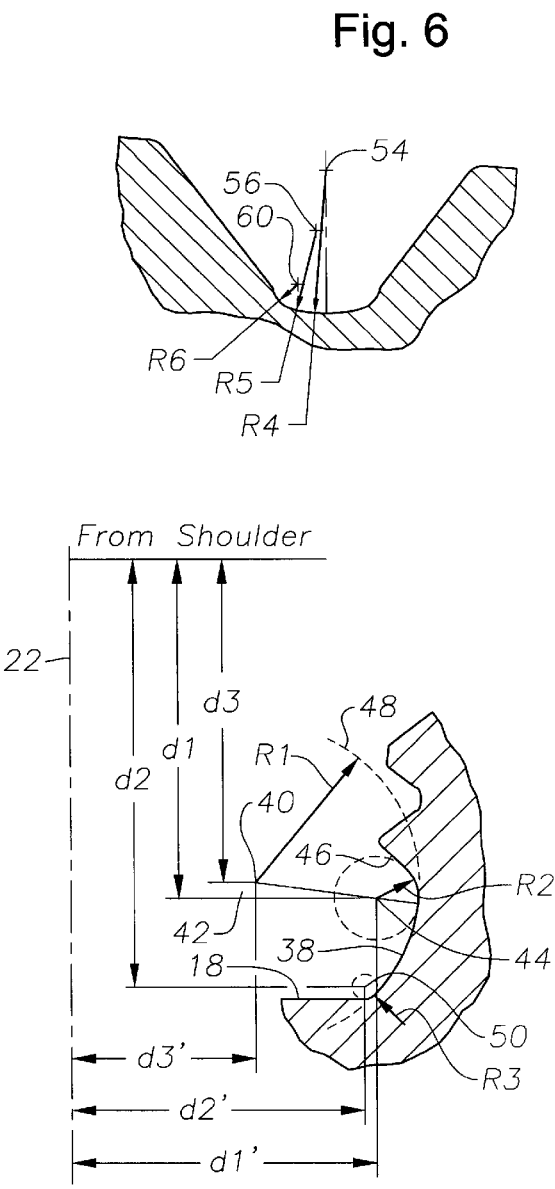
Fig. 6
Fig. 5

2" Taper per foot 37.5°   37.5°

Pitch

R7

75°

75°

HIGH TORQUE THREADED TOOL JOINT FOR DRILL PIPE AND OTHER DRILL STEM COMPONENTS

BACKGROUND OF THE INVENTION

1. Field of the Invention

This invention relates generally to threaded tool joints from drill pipe and the like and more specifically concerns a high torque threaded tool joint for drill pipe having tapered threads which is arranged and designed for enhanced shear strength, faster make-up and low stress concentration for significantly longer fatigue life.

2. Description of Prior Art

In the drilling of wells by rotary drilling techniques, multiple sections of drill pipe or drill stem members are utilized, with such sections usually having internally threaded box (female) connections at the upper ends thereof and externally threaded pin (male) connections at their lower ends. The terms "upper" and "lower" are used herein to describe the orientation of a section of drill pipe as it is used during make up of the drill pipe string. The "upper" end is sometimes called the female end; the "lower" end, the male end. There are situations where the pin end of the drill pipe extends upwardly.

The box and pin connections at each end of drill stem members along the length of the drilling string are typically made up and separated a number times during each well drilling operation. Thus, rapid thread make-up and break-out is desirable. During rotary well drilling, the drill bit, drilling stabilizers and other components of the drill string can encounter resistance to free rotation, such as when formation material sloughs away and enters the well bore or when long sections of drill pipe rub against the hole wall. When resistance to rotation is encountered, the drill string can become subject to significantly high torque forces as the rotary drive system of a drilling rig imparts torque force to the drilling string.

Especially when deep wells are being drilled and significant torque forces are likely to be encountered, it is desirable to provide high torque threaded tool joints for the drill stem connections along the length of the drill stem so that the drill stem will not be subject to failure by elevated torque forces. Also, it should be remembered that when rotary motion is imparted to a drill string for the purpose of drilling a well, the drill string can be subject to a certain degree of wobbling, thereby causing the various tool joints thereof to be subject to cyclic bending forces. It is desirable to provide a tool joint construction having interengaging shoulders that resist bending moments of the box and pin connections thereof to minimize the potential for enhanced fatigue thereof. Further, because high pressure drilling fluid is pumped through the flow passage of the drill string during drilling operations and is pumped at a relatively high flow rate and high pressure, the threaded connections at the various tool joints of the drill string must be capable of maintaining efficient sealing even in the presence of abrasive particular material that is present in drilling fluid being handled thereby. Because of its abrasive nature, the drilling fluid quickly cuts out a threaded tool joint if drilling fluid leakage occurs. It is desirable, therefore to provide a tool joint having interengaging threads that have enhanced surface-to-surface contact to enhance the capability of he threaded connection to withstand elevated torque forces and provide a predetermined thickness of the interengaged threads to withstand shearing when subjected to both torque forces and tensile loads.

Other manufacturers in the industry have developed tool joints for drill pipe that are intended to accommodate high torque forces. Examples of such high torque tool joint designs are presented by U.S. Pat. No. 4,548,431 of Hall, et al and U.S. Pat. No. 5,549,336 of Hori, et al.

IDENTIFICATION OF OBJECTS OF THE INVENTION

It is a principal object of the present invention to provide a novel high torque threaded tool joint for drill pipe having box and pin sections having double, interengaging shoulders for enhancing the torque resisting characteristics;

It is another object of the present invention to provide a novel high torque threaded tool joint for drill pipe having tapered, high strength threads that are designed for rapid make-up and enhanced shear strength per thread;

It is a further object of the present invention to provide a novel high torque threaded tool joint for drill pipe having a large root radius and having a smaller radius of intersection with thread flank surfaces to provide for minimized stress concentration at high torque and to thus provide for enhanced resistance to fatigue;

It is also an object of the present invention to provide a novel high torque threaded tool joint for drill pipe having a pin nose that is of cylindrical configuration rather than tapered as is conventional and which is substantially of the same diameter of the thread crests of the box connection but with a small amount of clearance to thus provide for enhanced torque resistance;

It is another object of the present invention to provide a novel high torque threaded tool joint for drill pipe wherein the box section of the box and pin connection includes a stress relief groove between the tapered thread and internal circular shoulder thereof and which has a predetermined curvature designed and arranged to minimize stress concentration and thereby enhance the fatigue life of the tool joint;

It is another object of the present invention to provide a novel high torque threaded tool joint for drill pipe having pin threads that are cut on a continuous radius tangent to the normal tapered pitch line of the threads, thereby forcing more contact between all of the threads for the purpose of enhancing the fatigue capacity of the tool joint; and It is another object of the present invention to provide a novel high torque threaded tool joint for drill pipe having equal angle thread flanks and having sufficient thread height to minimize thread jumping, during high torque and tensile loading.

SUMMARY OF THE INVENTION

Briefly, the various objects and features of the present invention are realized by providing a tool joint for drill pipe having double, interengaging shoulders and tapered high strength threads that are designed for rapid make-up and which are designed to provide the box and pin connection with exceptional bending strength ration and torque resistance as well as exceptional shear strength. The tool joint is provided with tapered threads having equal angle thread flanks which are thicker, higher torque threads as compared to conventional threads for enhanced torque resistance and shear resistance in high torque service. The threads are designed with a large root radius to decrease stress concentration and with smaller radii of intersection with adjacent thread flank surfaces to efficiently resist torque and to minimize stress and to provide for enhanced shear strength. The box section of the box and pin connection includes a stress relief groove between the tapered thread and internal circular shoulder thereof which have a predetermined curvature to minimize stress concentration and thereby enhance the fatigue life of the tool joint. The tool joint is provided with a pin nose that is of cylindrical configuration rather than tapered as is conventional and which is substantially the same diameter with clearances of the thread crests of the box connection to provide enhanced torque resistance. The tapered pin threads are cut on a continuous radius tangent to the so normal tapered pitch line of the threads, thereby forcing more contact between all of the threads for the purpose of reducing the stress concentration at the root of the last engaged thread and of enhancing the tensile carrying capacity of the tool joint.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as part hereof.

The appended drawings illustrate only a typical embodiment of this invention and are therefore not to be considered limiting of its scope, for the invention may admit to other equally effective embodiments.

In the Drawings:

FIG. 1 is a sectional view illustrating a high torque tool joint for drill pipes constructed in accordance with the present invention and showing a threaded box and pin connection;

FIG. 2 is a sectional view showing the pin for the connection of FIG. 1;

FIG. 3 is a sectional view showing the box for the connection of FIG. 1;

FIG. 4 is an enlarged fragmentary sectional view of the box and pin connection members of FIG. 1, shown fully made up;

FIG. 5 is an enlarged fragmentary sectional view of the box connection of FIG. 4, showing circular stress relief groove thereof in detail;

FIG. 6 is an enlarged fragmentary sectional view of the thread form of the high torque tool joint;

FIG. 7 is an enlarged fragmentary sectional view of the box connection of the tapered thread type tool joint, showing the generally elliptical root of the threads which is defined a large central radius and with smaller radii on each side thereof for intersection with the adjacent flank surfaces of the thread;

FIG. 8 is an enlarged fragmentary sectional view of the tapered high torque threaded tool joint of the present invention, showing the threads of the box and pin sections being made up and showing the tapered pitch line of the threads in relation thereto;

FIG. 9 is an enlarged fragmentary sectional view of the threaded section of the pin section of the high torque tool joint of the present invention, showing further details of the thread design;

FIG. 10 is an enlarged fragmentary sectional view of the pin thread of the high torque tool joint hereof; and FIG. 11 is an enlarged fragmentary sectional view of the internal tapered thread of the box section of the high torque tool joint of the present invention.

DETAILED DESCRIPTION OF PREFERRED EMBODIMENT

Figure 1:
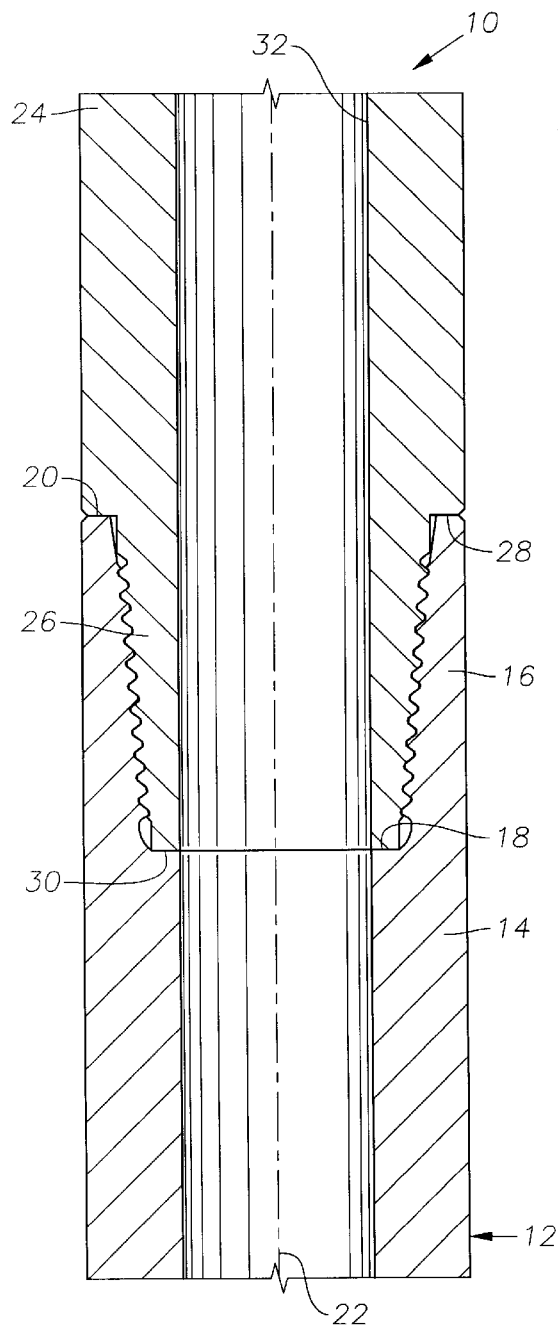
Figure 2:
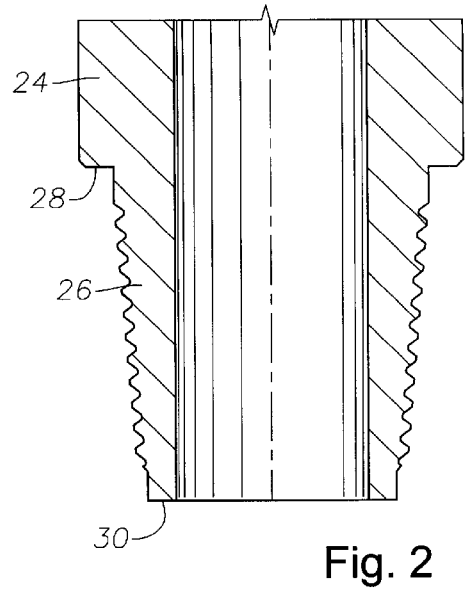

Referring now to the drawings and first to FIG. 1, a high torque threaded tool joint for drill pipe is shown generally at 10 wherein drill pipe shown generally at 12 is provided with a box section 14 having an internally threaded box 16 defining an upwardly facing circular internal shoulder 18 and an upwardly facing external shoulder 20 with shoulder faces 18 and 20 being oriented in normal relation with the longitudinal center-line 22 of the tool joint. The tool joint also incorporates a pin section 24 having at the lower end thereof an externally threaded pin 26 and defining a circular, downwardly facing shoulder 28 for force transmitting contact with the upwardly facing box shoulder 20 and a downwardly facing circular end surface 30 disposed for force transmitting contact with the upwardly facing shoulder face 18. For transmission of drilling fluid therethrough, the drill pipe defining the tool joint is provided with a longitudinal flow passage 32.

The double shouldered interengagement of the circular, planar shoulders 18 and 20 of the box section 14 and 28 and 30 of the pin section 24 provide the tool joint with enhanced resistance to torque induced stresses. As the stresses of drill pipe rotation are transmitted through the drill string and through the tool joint, such forces are also effectively transmitted through the interengaging shoulders of the box and pin connections of the tool joint.

Figure 3:
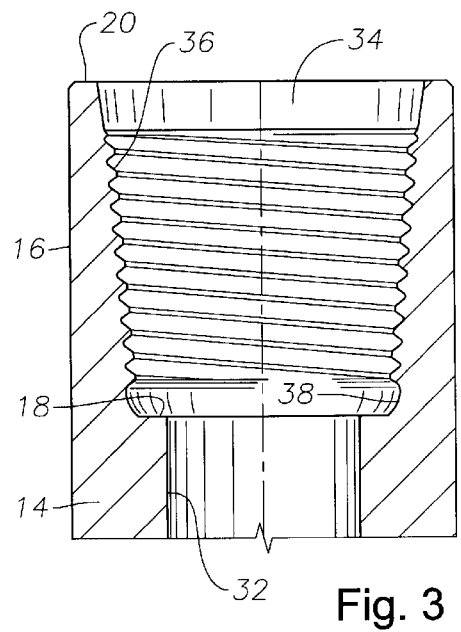

As shown more clearly in FIG. 3 and in the fragmentary assembly view of FIG. 4, the box section 14 defines at its upper end a tapered internal circular surface section 34 extending between the circular shoulder or end face 20 and the internal threads 36 of the internally threaded section 16 of the box. This tapered internal surface serves as an orienting and guide surface for guiding the externally threaded section 26 of the pin 24 as the pin is moved downwardly into the box section 14 to initiate tool joint makeup.

For the reason that the tool joint will be subjected to high torque forces during use thereof, it is desirable to minimize torque induced stress of both the box and pin sections of the tool joint. Although torque stresses, shear forces and the like will be accommodated by the tool joint thread design, to be discussed in detail hereinbelow, the box section 14 of the tool joint is internally machined to define an internal stress relief groove 38 as illustrated as FIG. 4. This internal stress relief groove is shown in greater detail in FIG. 5 wherein a significant portion or segment of the curvature thereof is defined about a first radius R1 generated about a first center point 40, the center point 40 being angularly offset with respect to a reference line 42 that is oriented in normal relation with the center-line 22. The angular offset of center point 40 with respect to the reference line 42 is preferred to be about one degree from a center point 44 which is established on the reference line 42. This one degree offset relation however, is not intended to be limiting with respect to this invention, it being within the scope of the present invention to establish any other offset relation as desired or to locate the center point 40 on or on the opposite side of the reference line 42.

Another portion or segment of the curvature of the relief groove 38 is defined by a second radius R2 which is generated about a second center point 44 and which merges smoothly with the lower thread flank 46 of the lower thread 48 of the internal threads 36. This smooth intersection of the curved stress relief groove 38 also functions to minimize the development of stresses as the box section of the tool joint is subjected to elevated torque and tensile stresses.

To further minimize the development of stress at the intersection of the stress relief groove 38 with the internal circular planar shoulder 18 of the box section 14, a third radius R3 is generated about a third center point 50 as shown in FIG. 5 so that the stress relief groove surface merges smoothly with the planar internal shoulder surface 18 of the box section.

Figure 9:
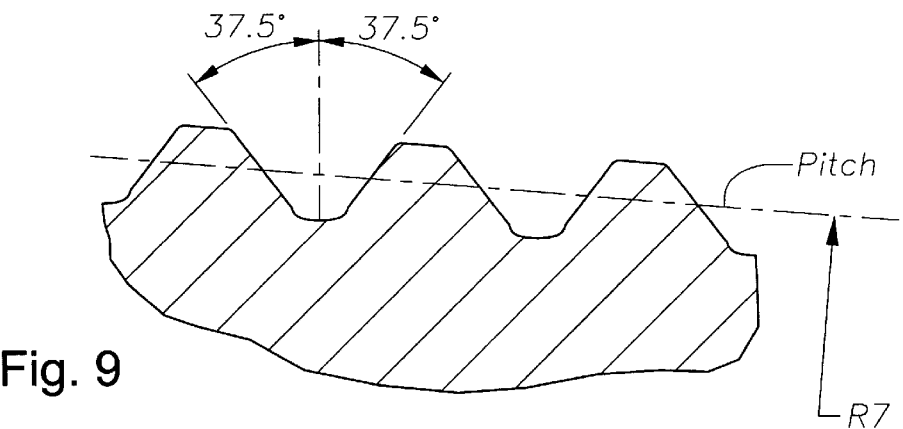
Figure 10:
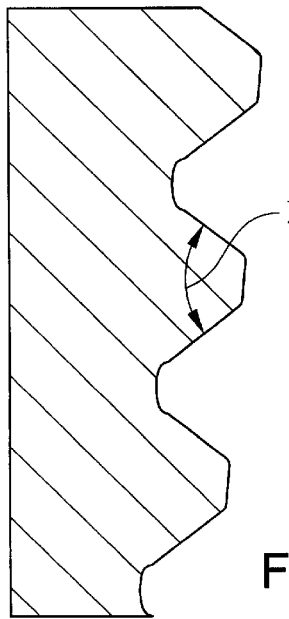
Figure 11:
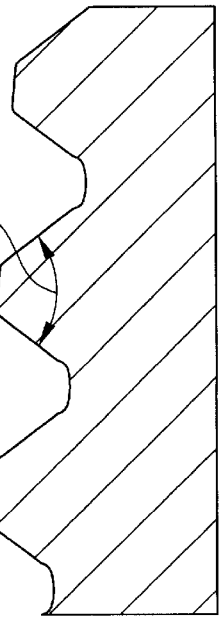

As mentioned above, the torque and tensile force resisting characteristics of the tool joint hereof are enhanced to a significant extent by the thread geometry described as follows in connection with FIGS. 6–11. The thread geometry is tapered so as to permit faster makeup of the threaded connection of the tool joint and to provide the box and pin sections of the tool joint with exceptional bending strength ratio. For example, a standard thread geometry for the tool joint of a drill string will have 2" taper per linear foot for enhanced bending strength ratio and will be provided with equal angle thread flanks similar to API, Acme, NPT and 60° V-threads. To provide for higher torque and thicker thread geometry in order to thus provide enhanced shear strength per thread, the tapered thread of the present invention has a 75° angle between adjacent thread flanks as shown in FIG. 9. The resulting thread has a much larger base as compared to conventional threads such as those indicated above, so that the resulting thicker thread base thereof provides enhanced shear strength per thread. Thus, the tool joint of the present invention has enhanced characteristics of shear strength and high tolerance to torque in a working environment of high torque and high tensile loads. It is to be borne in mind that the 75° angle between adjacent thread flanks that is mentioned above is not intended to be limiting of this invention, it being within the spirit and scope hereof to utilize wide thread geometries having an included angle between thread flanks of less than or greater than 75°, preferably in a range between 65° and 85°.

Figure 7:
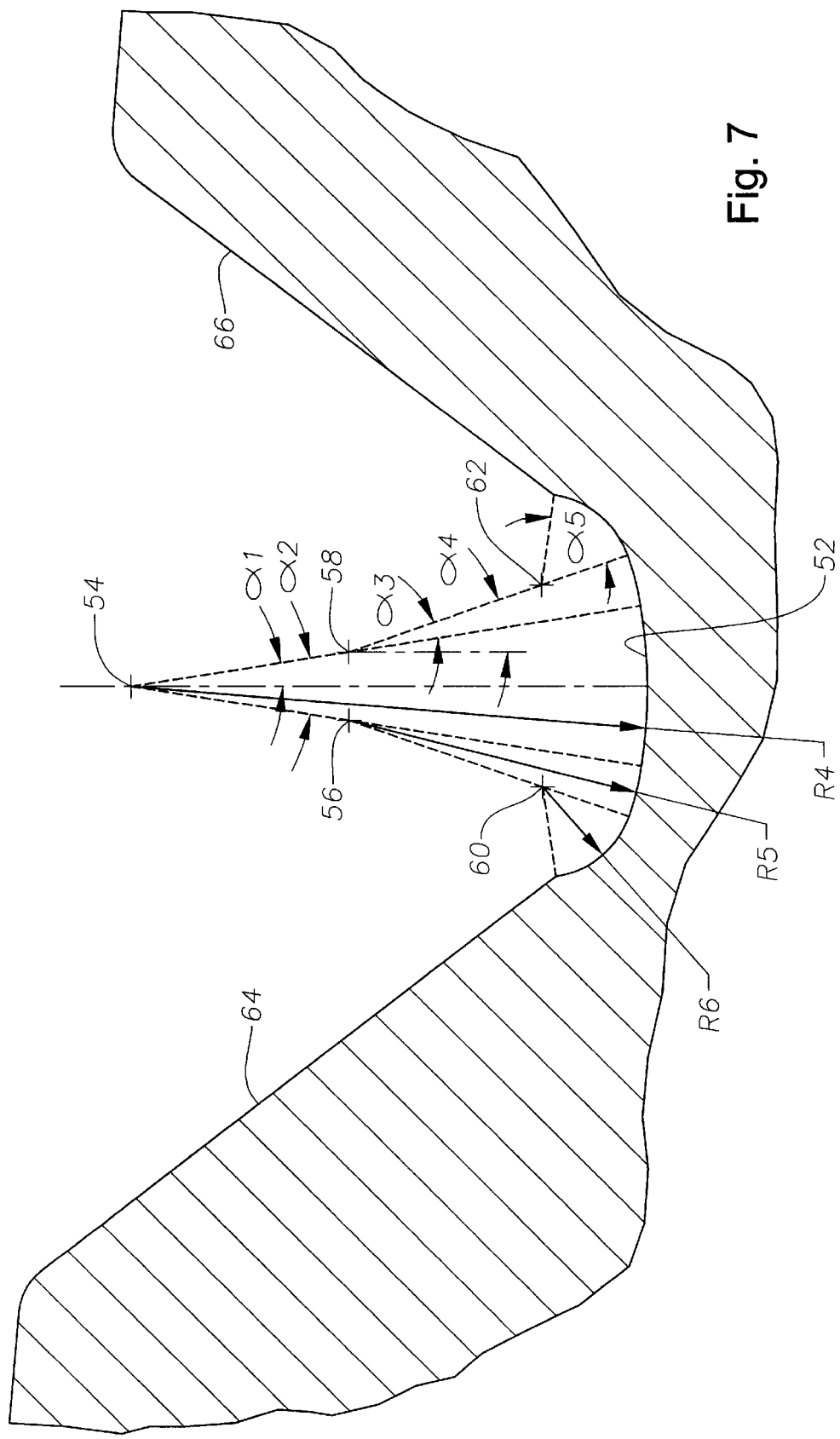
Figure 8:
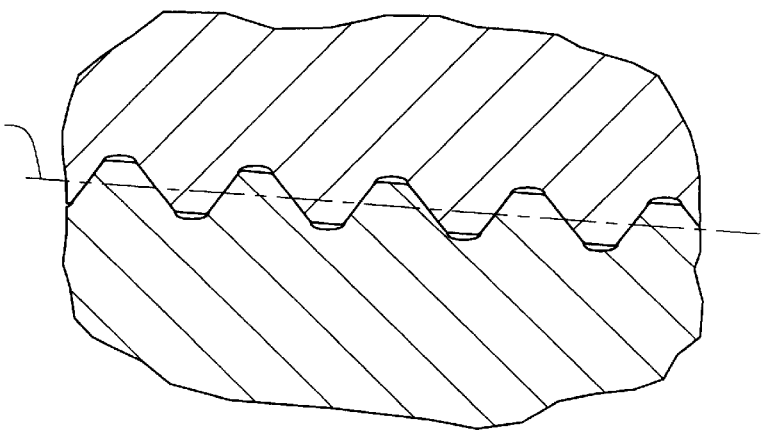

A further feature which enhances the high torque and shear strength characteristics of the thread geometry hereof is shown in FIG. 7, where the root surface between adjacent threads of both the box and pin thread connections is of generally elliptical configuration with a central region of the root surface 52 being generated about a center point 54 and with intermediate regions on each side of the central region being defined about central points 56 and 58. Lateral sections of the root surface 52 located outwardly of the intermediate root surface sections are defined about a pair center points 60 and 62. The lateral root surface sections also has smooth transitions with adjacent thread flank surfaces 64 and 66 as shown in FIG. 7. The large root surface that is defined by the radius surface segments generated by radii from differing center points as described above, provide for lower stress concentration for enhanced fatigue life of the threads.

The thread height of a conventional H-90 thread is 0.1000". The threads of the tool joint of the present invention, however, are of greater height than 0.1000" but yet are of less thread height than conventional I.F. or F.H. With the broader 75° thread hereof and the enhanced height as compared to the H-90 thread, less tendency exists for jumping a thread during makeup. Further, the threads of this invention are quite coarse, i.e. in the range of about 3-½ threads per inch, thereby providing for greater torque resistance and faster thread makeup. Additionally, the thicker, 75° thread provides significantly enhanced shear strength per thread as compared to conventional 60° threads.

Another feature that is evident from FIG. 4 is that the externally threaded pin section 26 defines at its lower end, a cylindrical external surface segment 68 rather than the usual tapered nose surface section of conventional pin couplings. The cylindrical external surface segment 68 thus intersects the planar circular downwardly facing end surface 30 of the pin section in normal relation with respect to the planar circular shoulder surface 18. Thus, the externally threaded pin section of the tool joint hereof is defined as having a straight nose rather than the usual tapered nose, with the outer diameter defined by the cylindrical surface segment 68 being of the same diameter as the inside diameter of the box thread crests. This feature also enhances the torque resisting capability of the tool joint. The threads of the externally threaded section of the pin are cut on a continuous radius tangent to the normal tapered pitch line, with the result that more contact is achieved between the internal and external threads of the tool joint which enhance the torque resisting characteristics of the joint when made up.

It is thus seen that the double shouldered, high torque, tapered, 75° thread of the present invention, with its stress relief, both at the stress relief groove of the box section and the broad, essentially elliptical thread root surfaces, provides an enhanced strength tool joint having the capability of efficiently withstanding conditions of high torque and high tensile load. Because of its tapered geometry, the threaded connection can be rapidly made up during drill pipe assembly, and yet provides pin and box tool joint sections having exceptional bending strength. Also, because the threads are cut on continuous, radius tangent to the normal tapered pitch line, the internal threads of the box section and the external threads of the pin section of the tool joint have enhanced surface area contact which consequently enhances the torque capacity of the tool joint. The equal angled, 75° thread with its large root radius and smaller radius of intersection with flank surfaces, efficiently lowers the stress concentration to which the threads are subjected during use. These 75° threads, being quite thick at the base thereof, provide enhanced shear strength per thread and thus enhance the high torque resisting capability and shear strength of the tool joint threads.

In view of the foregoing it is evident that the present invention embodied in a threaded connection for drill pipe is one well adapted to attain all of the objects and features herein above set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive. The scope of the invention is indicated by the claims rather than the foregoing description, and all changes which come within the meaning and range of equivalence of the claims are therefore intended to be embraced therein.

What is claimed is:

1. In a drill pipe tool joint having an internally threaded box section and an externally threaded pin section, the improvement comprising:
   (a) the box section having internal and external circular face shoulders and a tapered internal threaded section;
   (b) the pin section having circular shoulder surfaces having face to face engagement with said internal and external circular face shoulders of said box section when the tool joint is made up;
   (c) said box section and said pin section each having tapered equal angled threads having a thread flank angle in a range of 65° to 85° and being disposed in threaded interengagement when the tool joint is made up; and
   (d) said tapered equal angled threads having generally elliptical root surfaces for minimizing stress concentration, said generally elliptical root surfaces being defined by a large root radius and by a radius of intersection with adjacent thread flanks defined by radii smaller than said large root radius.

2. The improvement of claim 1, wherein:

said tapered equal angled threads having an included angle of about 75° between thread flanks thereof.

3. The improvement of claim 1, further comprising, a stress relief groove between said tapered internal threaded section and said internal circular face shoulder and being characterized by a substantially continuous curvature from said internal threads of said box section to said internal circular shoulder within said box section.

4. The improvement of claim 3, wherein:

said stress relief groove having a first groove surface segment being defined by a first radius from a first center point, a second groove surface segment defined by a second radius smaller than said first radius from a second center point, and a third groove surface segment defined by a third radius smaller than said second radius from a third center point.

5. The improvement of claim 4, wherein:

said second groove surface segment merging said first groove surface segment with said internal threads of said box section.

6. The improvement of claim 4, wherein:

said third groove surface segment merging said first groove surface segment with said planar circular internal shoulder of said box section.

7. In a drill pipe tool joint having an internally threaded box section and a externally threaded pin section, an improvement comprising:

(a) the externally threaded pin section defining a tapered pitchline;

(b) the externally threaded pin section having threads defining a continuous radius tangent to said tapered pitchline;

(c) said box section having an upwardly facing planar circular upper end surface and an upwardly facing circular internal planar shoulder and having internal tapered threads located between said upwardly facing planar circular upper end surface and said upwardly facing circular planar shoulder and having a circular internal stress relief groove located between said internal tapered threads and said upwardly facing circular planar shoulder and having a substantially continuous taper from said internal tapered threads and said upwardly facing circular planar shoulder.

8. The improvement of claim 7, wherein:

said threads are dimensioned for about three and one/half threads per linear inch.

9. The improvement of claim 7, wherein:

said threads have a thread height exceeding 0.1000 inches.

10. The improvement of claim 7, wherein:

(a) the box section has an upwardly facing planar circular upper end surface and an upwardly facing circular internal planar shoulder and has internal tapered threads located between said upwardly facing planar circular upper end surface and said upwardly facing circular planar shoulder; and (b) the box section has a circular internal stress relief groove located between said internal tapered threads and said upwardly facing circular planar shoulder and has a substantially continuous taper from said internal tapered threads and said upwardly facing circular planar shoulder.

11. The improvement of claim 7, wherein:

said internal stress relief groove having substantially continuous curvature from said internal threads of said box section to said internal circular shoulder within said box section.

12. The improvement of claim 11, wherein:

said internal stress relief groove having a first groove surface segment defined by a first radius from a first center point, a second groove surface segment defined by a second radius smaller than said first radius from a second center point, and a third groove surface segment defined by a third radius smaller than said second radius from a third center point.

13. The improvement of claim 7, wherein:

said tapered equal angled threads having a generally elliptical root surface for minimizing stress concentration.

14. The improvement of claim 13, wherein:

said generally elliptical root surface being defined by a large root radius and by radius of intersection with adjacent thread flanks being defined by radii smaller than said large root radius.

15. The improvement of claim 7, wherein:

said tapered equal angled threads having an included angle of about 75° between thread flanks thereof.

16. A drill pipe tool joint, comprising:

(a) an internally threaded box section having internal and external circular face shoulders and a tapered internal threaded section and an externally threaded pin section, the improvement comprising:

(b) an externally threaded pin section having circular shoulder surfaces having face to face engagement with said internal and external circular face shoulders of said box section when the tool joint is made up;

(c) said box section and said pin section each having tapered equal angled threads having a thread flank angle of about 75° and being disposed in threaded interengagement when the tool joint is made up; and (d) said tapered equal angled threads having generally elliptical root surfaces for minimizing stress concentration, said generally elliptical root surfaces being defined by a large root radius and by a radius of intersection with adjacent thread flanks defined by radii smaller than said large root radius.

17. The drill pipe tool joint of claim 16, wherein:

said box section having a circular internal stress relief groove having a first groove segment defined by a first radius from a first center point, a second groove surface segment defined by a second radius smaller than said first radius from a second center point, and a third groove surface segment defined by a third radius smaller than said second radius from a third center point.

* * * * *